United States Patent [19]

Siepker

[11] Patent Number: 5,916,062
[45] Date of Patent: Jun. 29, 1999

[54] PROCESS AND SYSTEM FOR AIDING A STARTING MOVEMENT OF A VEHICLE

[75] Inventor: Achim Siepker, Munich, Germany

[73] Assignee: Bayerische Motoren Werke Aktiengesellschaft, Muenchen, Germany

[21] Appl. No.: 08/903,745

[22] Filed: Jul. 31, 1997

[30] Foreign Application Priority Data

Jul. 31, 1996 [DE] Germany .......................... 196 30 870

[51] Int. Cl.⁶ ..................................................... B60T 8/32
[52] U.S. Cl. ......................... 477/194; 477/184; 477/186; 477/196; 303/191; 303/24.1; 701/70
[58] Field of Search ..................................... 477/194, 195, 477/196, 183, 184, 901, 92; 303/191, 24.1; 701/70

[56] References Cited

U.S. PATENT DOCUMENTS

| | | | |
|---|---|---|---|
| 4,629,043 | 12/1986 | Matsuo et al. | 477/194 X |
| 4,660,691 | 4/1987 | Messersmith et al. | 477/194 X |
| 4,667,471 | 5/1987 | Fulmer et al. | 303/191 X |
| 4,681,196 | 7/1987 | Fulmer et al. | 303/191 X |
| 4,717,207 | 1/1988 | Kubota et al. | 477/194 X |
| 4,790,606 | 12/1988 | Reinecke | 303/191 |
| 4,871,215 | 10/1989 | Takayama et al. | 303/191 |
| 4,930,607 | 6/1990 | Shimamura et al. | 477/196 |
| 5,129,496 | 7/1992 | Sigl et al. | 477/196 X |
| 5,333,944 | 8/1994 | Shirai et al. | 303/191 X |
| 5,484,044 | 1/1996 | Bursteinas et al. | 303/24.1 X |
| 5,580,136 | 12/1996 | Hanschek | 477/186 X |

FOREIGN PATENT DOCUMENTS

| | | |
|---|---|---|
| 0 523 338 | 1/1993 | European Pat. Off. . |
| 36 18 532 C2 | 12/1986 | Germany . |
| 36 42 874 A1 | 6/1988 | Germany . |
| 38 41 978 A1 | 6/1990 | Germany . |
| 40 17 857 A1 | 12/1991 | Germany . |
| 40 27 793 | 3/1992 | Germany . |
| 42 36 240 | 4/1994 | Germany . |
| 44 21 088 | 10/1994 | Germany . |
| 44 34 596 A1 | 10/1995 | Germany . |
| 195 25 552 | 1/1997 | Germany . |

*Primary Examiner*—Charles A. Marmor
*Assistant Examiner*—Ankur Parekh
*Attorney, Agent, or Firm*—Evenson, McKeown, Edwards & Lenahan, P.L.L.C.

[57] ABSTRACT

The invention relates to a process and a system for aiding a starting movement of a vehicle. Problems occur particularly when starting on a hill or on a steeply sloping road because it is difficult or impossible for the vehicle operator to simultaneously release the foot brake pedal and operate the accelerator pedal and thus provide an engine torque necessary for the corresponding starting operation. It is an object of the invention to provide a process and a system for aiding a starting movement of a vehicle by means of which the starting movement can be carried out without problems and in an uncomplicated manner and without endangering other traffic participants. In the process and system according to the invention, this is achieved in that the rest position of the vehicle is ensured by means of a braking intervention by way of an external power or secondary brake circuit if the braking force exercised by the vehicle operator is not sufficient. The engine torque generated by the driving engine of the vehicle is sensed and the braking intervention is terminated as of a defined engine torque.

16 Claims, 2 Drawing Sheets

PROCESS AND SYSTEM FOR AIDING A STARTING MOVEMENT OF A VEHICLE

CROSS-REFERENCE TO RELATED APPLICATIONS

This application is related to U.S. Pat. application Ser. No. 08/903,744, of common inventorship and common ownership.

BACKGROUND AND SUMMARY OF THE INVENTION

This application claims the priority of German Application No. 196 30 870.4, the disclosure of which is expressly incorporated by reference herein.

The invention relates to a process for aiding a starting movement of a vehicle from a standstill.

It is known that problems occur when starting movement of a vehicle on an incline such as a hill, particularly in a vehicle having a manual transmission. The vehicle operator must, for example, release the foot brake pedal in order to be able to operate the accelerator pedal and thus be able to provide an engine torque required for the starting operation. This sometimes presents problems. Only experienced and skillful vehicle operators can use the mechanical parking brake for this type of starting without any problems. The starting operation becomes the more difficult the steeper the slope.

Particularly when attempting to start movement of the vehicle while on an incline, the vehicle frequently rolls rearward and endangers other traffic participants.

It is an object of the invention to provide a process for aiding a starting movement of a vehicle from a standstill which makes it possible for the user to start movement of the vehicle without any problems in a simple, uncomplicated and effective manner as well as in any position of the vehicle.

This and other objects have been achieved according to the present invention by providing a process for aiding a starting movement of a vehicle from a stopped position, comprising the steps of: maintaining a brake pressure via a braking control input independent of a vehicle operator braking input in order to maintain the vehicle in the stopped position; sensing an engine torque generated by an engine of the vehicle; and terminating the maintaining step when the engine torque exceeds a limit value.

This and other objects have also been achieved according to the present invention by providing a process for aiding a starting movement of a vehicle from a stopped position, comprising the steps of: sensing a torque generated by an engine of the vehicle; and sensing a velocity of the vehicle; and when the velocity is zero, further comprising the steps of: determining a brake pressure value required to maintain the velocity of zero; maintaining the brake pressure value via a braking control input independent of a vehicle operator braking input; and terminating the maintaining step when the engine torque exceeds a limit value.

This and other objects have also been achieved according to the present invention by providing a system for aiding a starting movement of a vehicle from a stopped position, comprising: a control unit operably connected to a brake system of the vehicle; a velocity sensor which senses a velocity of the vehicle; a torque sensor which senses a torque generated by an engine of the vehicle; and a brake pressure sensor which senses a brake pressure in the brake system, wherein when the velocity sensor senses a velocity of zero, the control unit (a) determines a brake pressure value required to maintain the vehicle at the velocity of zero, (b) controls the brake system to maintain the brake pressure value, and (c) terminates maintaining the brake pressure value when the engine torque exceeds a limit value.

In modern vehicles, the operation of the wheel brakes is increasingly possible not only via the foot brake pedal but also via additional, so-called secondary brake circuits. Particularly in extreme driving situations, it is beneficial, for example, to protect the vehicle occupants and other participants in traffic via braking interventions conducted by an additional braking system independent of the driver-controlled foot brake which additional braking system is controlled as a function of sensed operating conditions of the vehicle.

In the case of the known anti-slip control or anti-lock braking systems, or vehicle stability control or traction control systems, this takes place by operating the vehicle brakes by means of an external power or secondary brake circuit. For this purpose, the vehicle brakes can be selectively uncoupled from the primary brake circuit (master brake cylinder controlled by the vehicle operator via the foot brake pedal) and can be acted upon by brake pressure from the secondary brake circuit via a pump/valves. This pressure admission may be independent of the position of the brake pedal. For generating the required brake pressure at the individual wheels by means of an external power or secondary brake circuit, the above-mentioned pump is therefore used and not the foot power of the vehicle operator. This is therefore a braking intervention by way of an external power, in which case there may be a superimposition of foot power and external power.

The present invention utilizes the concept of controlling the brake operation via an external power or secondary brake circuit independent of the foot brake input of the vehicle driver. In a first step of the process according to the invention, a braking intervention by means of an external power or an secondary brake circuit takes place when the vehicle is at a standstill, whereby the rest condition of the vehicle can be ensured. For this purpose, the required brake pressure is either (a) built up by the secondary brake circuit by generating an external power and then held by means of valves, or (b) if the vehicle operator has already provided the required brake pressure by operating the brake pedal, the brake pressure is maintained by means of valves. Thus, the standstill of the vehicle can also be ensured even when the brake pedal is not operated. The power generated by the driving engine of the vehicle or the corresponding engine torque will then be continuously sensed. If this engine torque exceeds a certain predetermined threshold value, the braking intervention which is continuously produced by means of the external power is terminated. The engine torque generated by the engine will exceed the predetermined limit value when the vehicle operator operates the accelerator pedal beyond a certain point. In the process according to the invention, as a result of the operation of the accelerator pedal, an intended starting operation is therefore recognized and when a certain engine torque is provided so that, for example, during a starting operation on a hill, a rearward rolling movement of the vehicle is prevented.

According to certain preferred embodiments of the present invention, the braking intervention by means of the external power does not take place before predetermined conditions exist. Such operating conditions may, for example, be the vehicle speed, a clutch switch, an engine operating signal and/or another activating switch.

Since, at the start of the braking intervention, the vehicle may not yet have completely reached a standstill, the pressure buildup preferably takes place slowly at the start of the braking intervention, particularly as a function of the vehicle speed and/or of time. This prevents a jerky stop and ensures a smooth slowing movement until the vehicle has come to a complete rest.

According to certain preferred embodiments of the present invention, the limit value at which the braking intervention by means of external power is completed corresponds to the power which is minimally necessary for ensuring the stoppage of the vehicle. One way of determining such a reference value consists of taking into account the brake pressure which exists at the point in time at which the vehicle speed has just reached zero. Naturally, vehicle-specific or environment-specific parameters may also be taken into account when determining such a reference value. Such data are, for example, the transmission ratio or the design for the first gear or the engagement of the reverse gear. With respect to environment-specific parameters, there is, for example, the vehicle tilt (slope, gradient) which can be determined, for example, from the anti-theft system or the analysis of the filling level of the tank.

In order to ensure a smooth starting movement, at the conclusion of the braking intervention, the brake pressure is preferably uniformly reduced corresponding to a predetermined course. In this case, it is advantageous to differentiate between an uphill start and a downhill start because a fast or slow release of the brake may be necessary as a function thereof. For this purpose, preferably the position of the gear selector lever as well as the information concerning the slope (e.g., directly as an angle-of-tilt sensor of the anti-theft warning system or of the analysis system of the tank filling level indicator) is utilized.

According to further preferred embodiments, a temperature compensation takes place in the case of a brake disk cooling. For this purpose, for example, a corresponding pretensioning can be given in the case of the brake operation. The higher pretensioning is taken into account during the release function by advancing the release operation. However, the temperature can also be taken into account or compensated by way of an aftertensioning operation while taking into account the rotational wheel speeds or a separate temperature model which determines and indicates the temperature.

Other objects, advantages and novel features of the present invention will become apparent from the following detailed description of the invention when considered in conjunction with the accompanying drawings.

DETAILED DESCRIPTION OF THE DRAWINGS

The process according to the invention advantageously utilizes a braking intervention by means of an external power or a secondary brake circuit, for example an anti-slip control or anti-lock braking system or a stability control or traction control system in a vehicle. This results in the existence of pressure maintaining valves and a separate pump assembly or of a controllable brake power assist unit independent of the foot brake pedal. For the embodiment described in the following, the vehicle speed must also be determinable. A clutch switch must be provided and a sensing device by means of which the operation of the engine can be checked. In addition, in the case of the embodiment described in the following, an activating switch is provided by means of which the "starting aid" function can be activated and deactivated.

Figure 1:
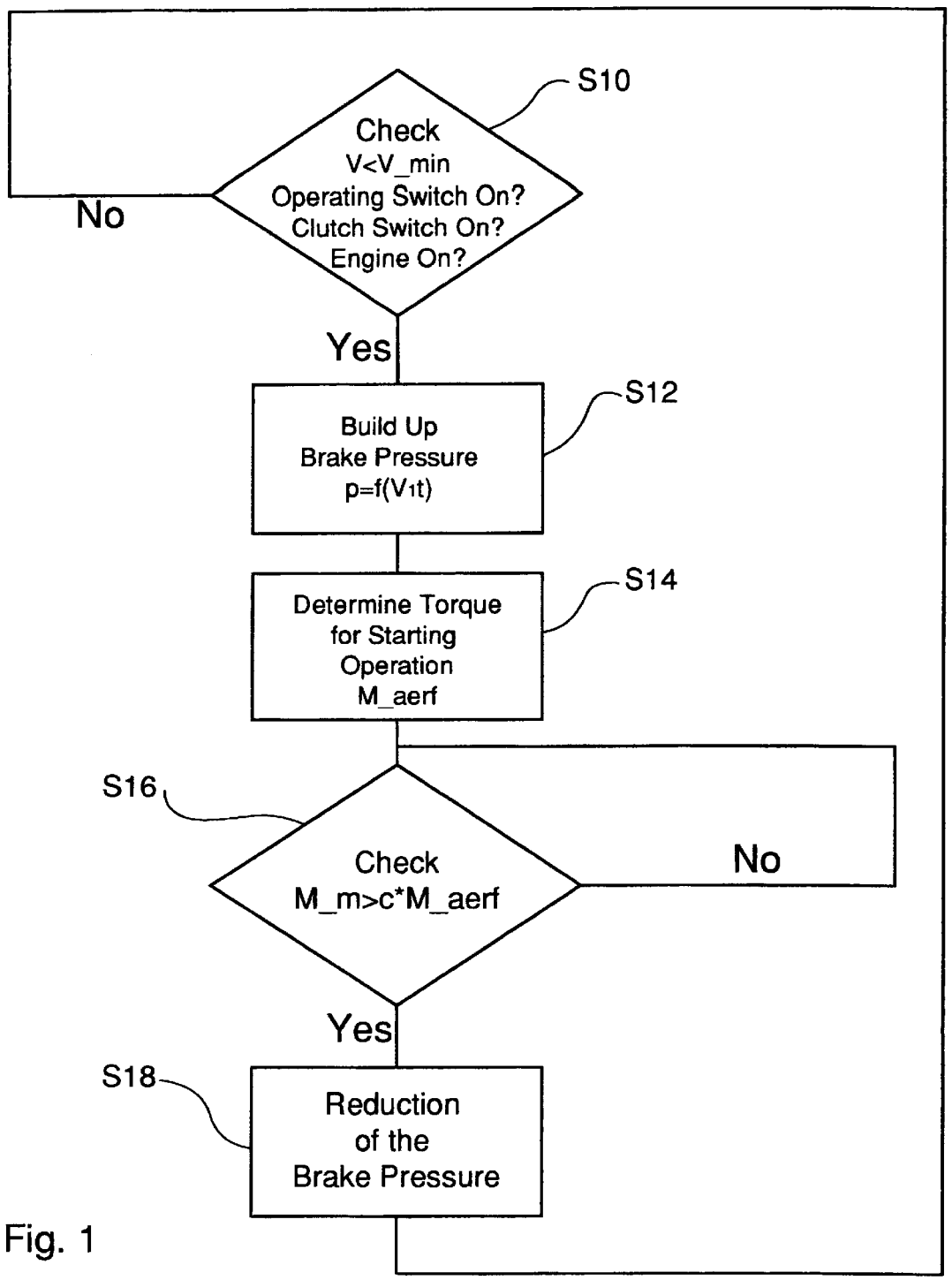
FIG. 1 shows a process of aiding a starting movement of a vehicle from a stopped position according to a preferred embodiment of the present invention.

According to Step 10 of FIG. 1, it is checked whether the vehicle speed V is lower than a given minimal speed V_min. In addition, it is checked whether the clutch switch is activated ("on") and the engine is operative ("on"). Finally, it is examined whether the separately provided activating switch or operating switch was set to "on". By means of the operating switch, the starting aid can be connected separately. However, it is also possible to do without such an activating or operating switch. For example, in the case of a corresponding manual pressure buildup by the vehicle operator and the above-mentioned additional conditions, the brake pressure for aiding the starting movement may be automatically maintained (via valves).

Even if only one of the conditions to be checked in Step 10 is not met, the check will be carried out again. If, in contrast, all conditions are met, this means that the "starting aid" program will be started, and a branch off to Step 12 takes place.

In Step 12, the braking intervention is carried out by way of the external power or secondary brake circuit. If a sufficient brake pressure already exists which was manually generated by the vehicle operator, it must only be maintained. In the first case, the brakes are selectively uncoupled from the primary brake circuit (master cylinder controlled by the vehicle operator via the foot brake pedal) and a pump generates a corresponding brake pressure p in a secondary brake circuit which is then connected with the vehicle brake. The brake pressure p is not built up immediately to a full extent but gradually in order to prevent an abrupt jerking. According to the indication in Step 12, the brake pressure may, for example, be a function of the vehicle speed and of the time; thus p=f(V, t).

Then, in Step 14, the torque is determined which is to be provided for the starting operation by the driving engine. For this purpose, a brake pressure p_Vor is noted down which corresponds to the brake pressure p_0 at the point in time t=0 when the speed has just become V=0 km/h. The tilt of the vehicle can also be taken into account when determining the starting torque. From p_0, a conclusion can be drawn with respect to a minimally required braking power which is required for holding the vehicle, for example, with respect to a gravitational force down a slope. From this brake pressure p_Vor, by way of a function into which vehicle specific data, such as the transmission ratio, the design for the first gear, etc. or environment-specific data are entered, a minimally required drive torque M_aerf can be determined which is necessary for the starting operation.

In Step 16, it is checked whether the engine torque M m generated by the engine is higher than the minimally required drive torque M_aerf, multiplied by a safety factor c. This safety factor may influence the comfort but may also take vehicle-specific parameters into account.

When the torque generated by the engine does not reach the limit value defined by the safety factor and the minimally required drive torque M_aerf, the checking is continued.

When the engine torque exceeds the above-mentioned limit value, a branch off to Step 18 takes place in which the braking pressure is reduced corresponding to a fixed course.

Since in this case the engine torque exceeds the minimally required drive torque for the starting operation, no rearward roll of the vehicle occurs when starting movement up a hill.

A brake disk cooling may be problematic so that a temperature compensation is required in order to prevent a rearward vehicle roll as a result of a loss of tension force. For this purpose a corresponding pretensioning is introduced during the determination of the brake pressure. This higher pretensioning is taken into account during the release function, thus during the termination of the braking intervention, by means of advancement of the release operation. However, the temperature can also be monitored and compensated by monitoring the rotational wheel speed or the simulation in a temperature model.

The process according to the invention represents an extremely simple and effective measure for ensuring a vehicle start, particularly on a hill, without any problems. Except for a possible operating element for the connection of the starting aid function, no additional hardware components are required.

Figure 2:
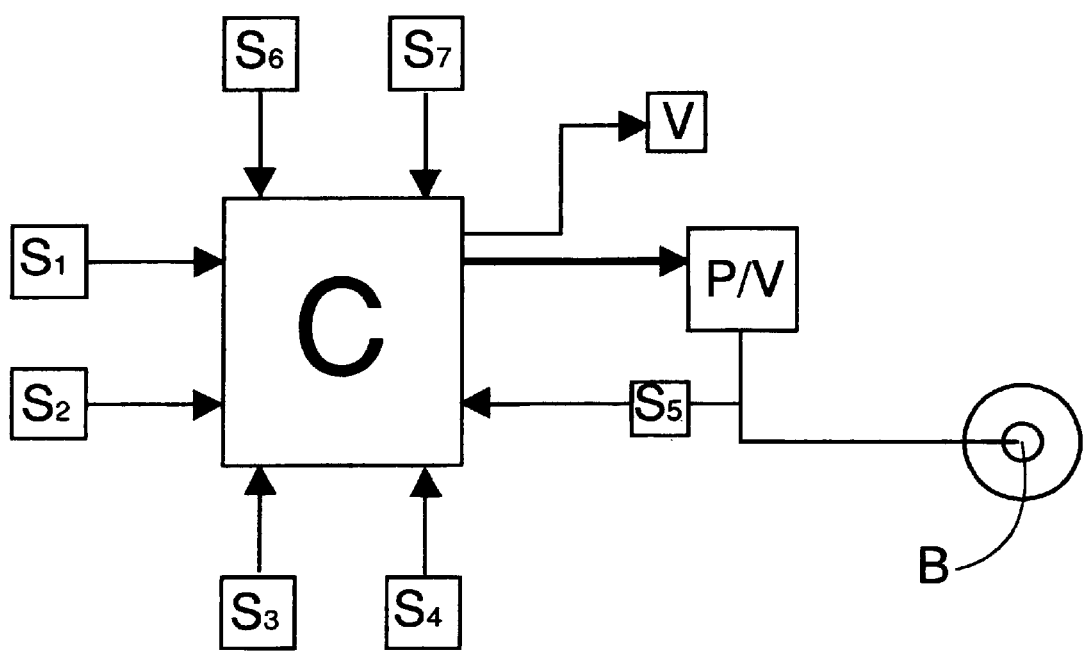
FIG. 2 shows a system for aiding a starting movement of a vehicle from a stopped position according to a preferred embodiment of the present invention.

As shown in FIG. 2, a system for aiding a starting movement of a vehicle from a stopped position according to the present invention includes a control unit C. The control unit receives input information from a plurality of sensors including at least sensors $S_1$ through $S_7$. Sensor $S_1$ senses the velocity of the vehicle; sensor $S_2$ senses whether the vehicle clutch is engaged; sensor $S_3$ senses whether the vehicle engine is on; sensor $S_4$ senses whether the "starting aid" system is on; sensor $S_5$ senses the brake pressure; sensor $S_6$ measures a tilt of the vehicle; and sensor $S_7$ measures the torque of the vehicle's engine. The control unit C may also receive various other input signals regarding operating parameters of the vehicle systems, and/or environmental parameters. The control unit C controls a pump and/or valves P/V in a secondary brake circuit, such as in an anti-lock braking system or a traction control system, which controls the brakes B of the vehicle. The secondary brake circuit is operable independently of a primary brake circuit controlled by the vehicle operator via a foot brake pedal. The primary brake circuit may be selectively uncoupled from the vehicle brakes B to allow exclusive control of the brakes B by the secondary brake circuit.

The system of the present invention aids a starting movement of the vehicle from a stopped position according to the above-described process. Specifically, the system senses the velocity of the vehicle via sensor $S_1$. When the velocity falls below a predetermined value, or is zero, the control unit C determines a brake pressure value required to maintain the velocity of the vehicle at zero. This brake pressure value may be the brake pressure sensed at the time of reaching zero velocity, or may be determined as a function of sensed parameters including, for example, the tilt of the vehicle. The control unit C maintains the determined brake pressure value via the pump/valves P/V. The control unit further senses an engine torque via sensor $S_7$, and terminates maintaining the brake pressure value when the engine torque exceeds a limit value. A visual signal V may be displayed to the vehicle operator when the process is activated. The control unit C may be a general purpose processor programmed with instructions that cause the processor to perform the described steps, specific hardware components that contain hard-wired logic for performing the described steps, or any combination of programmed general purpose computer components and custom hardware components. The control unit C may be part of the vehicle's central electronic control unit, or may be a separate dedicated unit.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A process for aiding a starting movement of a vehicle from a stopped position, comprising the steps of:
   determining a brake pressure value required to maintain said vehicle in said stopped position;
   applying said brake pressure value via a braking control input independent of a vehicle operator braking input;
   sensing an engine torque generated by an engine of the vehicle; and
   terminating said applying step when said engine torque exceeds a limit value determined as a function of said brake pressure value.

2. A process according to claim 1, wherein the brake pressure is applied only when predetermined vehicle operating conditions are met.

3. A process according to claim 2, wherein said operating conditions consist of at least one of a velocity of the vehicle, a disengagement signal of a clutch of the vehicle, an operating signal of said engine, and an activation signal for said process.

4. A process according to claim 1, wherein in said applying step, said brake pressure is gradually built up, at least as a function of said vehicle velocity and/or of the time.

5. A process according to claim 1, wherein said brake pressure value is determined as a function of a sensed brake pressure at the moment at which the velocity has just reached zero.

6. A process according to claim 5, wherein said brake pressure value is determined as a function an angle of tilt of the vehicle.

7. A process according to claim 1, wherein said brake pressure value is determined as a function of an angle of tilt of the vehicle.

8. A process according to claim 1, wherein said brake pressure value is determined as a function of vehicle-specific parameters.

9. A process according to claim 1, wherein in said terminating step the brake pressure is reduced corresponding to a predetermined course.

10. A process according to claim 1, wherein said applying step is conducted when the vehicle is parked with a parking brake applied and the engine or ignition is switched on.

11. A process according to claim 1, further comprising the step of displaying a visual signal to said vehicle operator when said process is activated.

12. A process for aiding a starting movement of a vehicle from a stopped position, comprising the steps of:
   determining a brake pressure value required to maintain said vehicle in said stopped position;
   applying said brake pressure value via a braking control input independent of a vehicle operator braking input;
   sensing an engine torque generated by an engine of the vehicle; and
   terminating said applying step when said engine torque exceeds a limit value,
   wherein said brake pressure value is controlled to compensate for a change in temperature of brake disks of the vehicle.

13. A process according to claim 12, wherein in said determining step said brake pressure value is adjusted to compensate for a potential tension force loss in the event of a brake cooling.

14. A process for aiding a starting movement of a vehicle from a stopped position, comprising the steps of:
   sensing a torque generated by an engine of the vehicle; and sensing a velocity of the vehicle; and when said velocity is zero, further comprising the steps of:

determining a brake pressure value required to maintain said velocity of zero;

applying said brake pressure value via a braking control input independent of a vehicle operator braking input; and terminating said applying step when said engine torque exceeds a limit value, wherein in said applying step, said brake pressure value is applied via a secondary brake circuit which is separate from a primary brake circuit controlled by said vehicle operator braking input, said secondary brake circuit being controllable by said braking control input independent of said vehicle operator braking input, said secondary brake circuit being a conventional anti-lock brake circuit.

15. A system for aiding a starting movement of a vehicle from a stopped position, comprising:

a control unit operably connected to a brake system of the vehicle;

a velocity sensor which senses a velocity of the vehicle;

a torque sensor which senses a torque generated by an engine of the vehicle; and a brake pressure sensor which senses a brake pressure in said brake system, wherein when said velocity sensor senses a velocity of zero, said control unit (a) determines a brake pressure value required to maintain said vehicle at said velocity of zero, (b) controls said brake system to apply said brake pressure value via a braking control input independent of a vehicle operator braking input, and (c) terminates application of said brake pressure value when said engine torque exceeds a limit value, wherein said control unit applies said brake pressure value via a secondary brake circuit which is separate from a primary brake circuit controlled by said vehicle operator braking input, said secondary brake circuit being controllable by said braking control input independent of said vehicle operator braking input, said secondary brake circuit being a conventional anti-lock brake circuit.

16. A process for aiding a starting movement of a vehicle from a stopped position, comprising the steps of:

determining a brake pressure value required to maintain said vehicle in said stopped position;

applying said brake pressure value via a braking control input independent of a vehicle operator braking input;

sensing an engine torque generated by an engine of the vehicle; and terminating said applying step when said engine torque exceeds a limit value, wherein in said applying step, said brake pressure value is applied via a secondary brake circuit which is separate from a primary brake circuit controlled by said vehicle operator braking input, said secondary brake circuit being controllable by said braking control input independent of said vehicle operator braking input, said secondary brake circuit being a conventional anti-lock brake circuit.

* * * * *